United States Patent Office 3,539,622
Patented Nov. 10, 1970

3,539,622
PROCESS FOR PRODUCING DIARYL COMPOUNDS
Richard F. Heck, Wilmington, Del., assignor to Hercules Incorporated, Wilmington, Del., a corporation of Delaware
No Drawing. Filed Dec. 23, 1966, Ser. No. 604,151
Int. Cl. C07c 15/14
U.S. Cl. 260—515                    10 Claims

ABSTRACT OF THE DISCLOSURE

A diaryl compound is produced from an aryl mercury salt by reaction with a palladium salt.

---

This invention relates to the production of symmetrical diaryl compounds.

In accordance with the present invention, it has been found that a symmetrical diaryl compound is produced by contacting an aryl mercury salt with a simple palladium salt or an inorganic complex salt thereof, at a temperature in the range of 20 to 150° C.

The aryl mercury salts which are operable are those in which the aryl group contains a benzene ring to which the mercury is directly attached. The preferred aryl mercury salts are those of the formula $$R{-}\!\!\left[\,Ar\,\right]\!\!{-}HgX$$
$$R'{-}\!\!\left[\phantom{Ar}\right]$$

where Ar is an organic nucleus containing at least one benzene ring to which the bonds are attached, X is an anion, and R and R', taken separately, are the same or different member of the group consisting of H, nitro, carboxy, carboalkoxy, alkoxy, —SH, alkylmercapto, halogen, and monovalent acyclic hydrocarbon groups, or R and R' taken together consists of a divalent acyclic hydrocarbon group of 3 to 4 carbon chain length between bonds.

The anion of neither the aryl mercury nor the palladium salt is critical. It may be chlorine, bromine, acetate, nitrate, bisulfate, methane sulfonate or any other stable anion.

The aryl mercury salt is produced by reacting an aryl compound having at least one benzene ring, and there is a substitutable hydrogen on one carbon thereof, with a mercury salt of the anion. In some cases, the aryl mercuric salt is preferably prepared indirectly from the aryl mercuric acetate by reaction of the aryl mecuric acetate with an alkali metal salt of the desired anion. The aryl mercuric salt of methanesulfonic acid is particularly useful since the aryl compound which forms the aryl mercuric salt is readily reacted with mercuric bis(methane sulfonate) under conditions suitable for the reaction with palladium chloride. The aryl mercuric methane sulfonate in this way is capable of being produced in situ and is readily induced to undergo the diarylation reaction by the reaction with palladium chloride. The aryl mercuric salt of other anions can also be produced in situ.

The temperature at which the aryl mercuric salt is reacted with the palladium salt is a temperature in the range of 20 to 150° C. The preferred temperature is one in the range of 20 to 70° C.

When the aryl mercury salt is produced in situ, the aryl compound is reacted with the mercuric salt $HgX_2$ to form the aryl mercuric salt of anion X at a temperature in the range of 20 to 150° C.

In the reaction of the aryl mercuric salt with the palladium salt, $PdCl_2$ or a complex thereof, the palladium is ordinarily reduced unless another salt is present which can oxidize the palladium back to its higher valence. Cupric salts are preferred for this oxidation and a molecular amount may be used or the cuprous salt produced may be oxidized by elementary oxygen back to the cupric state. In this latter case, the system is a redox system and other well-known redox systems may be substituted for it.

When an aryl mercuric methane sulfonate is reacted with palladium chloride in the absence of a cupric salt, the mercury is reduced from mercuric to mercurous and the palladium salt acts catalytically with little or no reduction to palladium of lower valence. In this case, the mercurous ion can be reoxidized by elementary oxygen without the use of copper salts. The methane sulfonate anion is advantageous in this respect.

The reaction of this invention is ordinarily carried out in the presence of a solvent. Suitable solvents are acetic acid (glacial or aqueous), an aqueous solution of methane sulfonic acid of concentration in the range of 40 to 70% (preferably 60% concentration), methanol, acetonitrile, and acetone.

The process of this invention is illustrated by the following examples in which all parts and percentages are by weight.

EXAMPLE 1

A mixture of 6.54 parts p-tolyl mercuric chloride, 2.69 parts cupric chloride, 0.2 part palladium chloride, 1.0 part lithium chloride in 100 parts acetic acid (glacial) was stirred for 17 hours at 24° C. and then diluted with water. The organic portion was removed by dissolving it in hexane. The organic portion recovered by evaporation of the hexane consisted of 1.33 parts 4,4'-dimethylbiphenyl (p,p'-bitolyl). It melted at 120.5–121° C. after crystallization from ethanol. The yield was 73% of theory.

EXAMPLE 2

Following the procedure of Example 1, 7.10 parts p-cumyl mercuric chloride yielded 1.88 parts (83% of theory) p,p'-bicumyl, M.P. 65–66° C.

EXAMPLE 3

Following the procedure of Example 1, 7.16 parts of m-nitrophenyl mercuric chloride reacted with the same reagents as in Example 1 in the same amounts yielded on extraction from the reaction mixture using benzene in place of hexane a 91% yield (2.22 parts) of m,m-dinitrobiphenyl, which melted at 200–202° C. after crystallization from acetic acid.

EXAMPLE 4

A mixture of 7.17 parts m-chloromercuribenzoic acid, 2.69 parts cupric chloride, 0.2 part palladium chloride, 1.0 part lithium chloride in 100 parts acetic acid (glacial) was stirred for 17 hours at 24° C. and then diluted with water. The organic portion was removed by extraction with benzene. From the benzene was recovered 1.81 parts (75% of theory) m,m'-dicarboxybiphenyl, which melted at 355–357° C. after crystallization from acetic acid.

EXAMPLE 5

A mixture of 7.76 parts 4-chloromercuri-2-nitroanisole, 0.35 part palladium chloride, 2.68 parts cupric chloride and 0.42 part lithium chloride in 100 parts acetic acid (glacial) was stirred 16 hours at 24° C. and then diluted with water and extracted with benzene. From the benzene solution, 7.0 parts 4,4'-dimethoxy-3,3'-dinitrobiphenyl separated on concentration and this melted at 224–225° C. after crystallization from acetic acid as yellow needles. This new compound analyzed 55.14% C, 4.24% H, and 8.83% N. It was further characterized by absorption at 342 m$\mu$ with $\epsilon$=4870 and at 257 m$\mu$ with $\epsilon$=31,600 in "isooctane" solution.

EXAMPLE 6

A mixture of 11.34 parts 4-chloromercuri-2-nitrochlorobenzene, 0.52 part palladium chloride, 4.0 parts cupric chloride, 0.63 part lithium chloride and 150 parts acetic acid (glacial) was stirred for 16 hours at 24° C. The resulting reaction mixture was diluted with water and extracted with benzene. The benzene solution yielded on evaporation to dryness a crude mixture from which 2.5 parts, 4,4'-dichloro-3,3'-dinitrobiphenyl crystallized as yellow plates, M.P. 236–237° C. This compound had λ maximum at 243 mμ with ε=26,600 and analyzed 45.49% C, 2.69% H and 9.52% N.

EXAMPLE 7

In a vessel were placed 136 parts of chloromercuri-o-xylene (0.4 mole), 53.8 parts of anhydrous cupric chloride (0.4 mole), 4.0 parts of palladium chloride (0.023 mole), 20 parts of lithium chloride (0.475 mole) and 2000 parts of glacial acetic acid. The mixture was stirred at room temperature (20–25° C.) for 16 hours. The mixture was then poured into 4,000 parts of distilled water. The solids were collected by filtration, washed with water and air dried. The solids were subjected to extraction in a Soxhlet apparatus with benzene for 2 hours. The extract was taken to dryness to yield 32 parts of a solid. Recrystallization from 95% ethanol gave 3,3',4,4'-bixylyl with M.P. 76–77° C.

EXAMPLE 8

A mixture of 0.01 mole of p-tolyl mercuric chloride, 0.01 mole phenyl mercuric chloride, 0.002 mole palladium chloride, 0.024 mole lithium chloride, 0.02 mole anhydrous cupric chloride and 100 parts of glacial acetic acid was stirred for 16 hours at room temperature (20–25° C.). The mixture was poured into a mixture of 200 parts of distilled water and 120 parts of hexane. After thorough mixing, the hexane layer was analyzed by gas chromatography. Three peaks were eluted besides the solvent hexane. Two of these peaks had retention times that corresponded to biphenyl and p,p'-bitolyl. A sample of the other peak was collected by preparative gas chromatography. This material was p-methylbiphenyl, M.P. 45–47° C. Mass spectral analysis showed a parent peak at 168 units, which corresponds to the assigned structure.

Aryl mercuric salts which undergo the dimerization reaction of this invention and the products obtained are further exemplified by the following tabulation:

The products of this invention are useful for preparing difunctional intermediates for the preparation of polymers. The dialkyl biaryls for example, on oxidation, yield dicarboxylic acids, and the dinitrobiaryls, on reduction, yield diaminobiaryls, and both are useful in preparing polyamides. In this use, the biphenyl products are particularly valuable. From benzoic acid, a dicarboxybiaryl is produced directly.

What I claim and desire to protect by Letters Patent is:

1. The process for producing a diaryl compound which comprises an aryl mercuric salt in which the aryl group contains a benzene ring to which the mercury is directly attached with a palladous salt at a temperature in the range of 20 to 150° C.

2. The process of claim 1 in which the aryl mercuric salt is represented by the formula

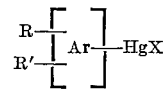

where X is a stable anion, Ar is an organic nucleus containing at least one benzene ring to which the bonds are attached and R and R' taken separately are the same or different members of the group consisting of H, nitro, carboxy, carboalkoxy, halogen, alkoxy and monovlent acyclic hydrocarbon groups or R and R' taken together consist of a divalent hydrocarbon group of 3 to 4 carbon chain length between bonds.

3. The process of claim 1 for producing a bis(alkylphenyl) which comprises contacting an alkylphenyl mercuric salt with a palladous salt.

4. The process of claim 1 for producing bitolyl which comprises contacting a tolylmercuric salt with a palladous salt.

5. The process of claim 1 for producing bicumyl which comprises contacting a cumyl mercuric salt with a palladous salt.

6. The process of claim 1 for producing a bis(nitrophenyl) which comprises contacting a nitrophenylmercuric salt with a palladous salt.

7. The process of claim 1 for producing a bis(benzoic acid) which comprises contacting a carboxyphenylmercuric salt with a palladous salt.

8. The process for producing a diaryl compound which comprises reacting a mercuric salt with an aryl compound, which aryl compound has at least one benzene ring in which there is a substitutable hydrogen on one

| Aryl mercuric salt | Product |
|---|---|
| Phenylmercuric chloride | Biphenyl. |
| p-Tolylmercuric chloride | Bis (p-tolyl). |
| m-Tolylmercuric chloride | Bis (m-tolyl). |
| o-Tolylmercuric chloride | Bis (o-tolyl). |
| Diphenylmercuric chloride | Bis (diphenyl). |
| Naphthylmercuric chloride | Bis (naphthyl). |
| Phenanthrylmercuric chloride | Bis (phenanthryl). |
| o-Nitrophenylmercuric chloride | Bis (o-nitrophenyl). |
| m-Nitrophenylmercuric chloride | Bis (m-nitrophenyl). |
| p-Nitrophenylmercuric chloride | Bis (p-nitrophenyl). |
| o-Carboxyphenylmercuric chloride | Bis (o-carboxyphenyl). |
| m-Carboxyphenylmercuric chloride | Bis (m-carboxyphenyl). |
| p-Carboxyphenylmercuric chloride | Bis (p-carboxyphenyl). |
| m-Carbomethoxyphenylmercuric chloride | Bis (m-carbomethoxyphenyl). |
| o-Chlorophenylmercuric chloride | Bis (o-chlorophenyl). |
| p-Chlorophenylmercuric chloride | Bis (p-chlorophenyl). |
| α-Methoxyphenylmercuric chloride | Bis (o-methoxyphenyl). |
| p-Methoxyphenylmercuric chloride | Bis (p-methoxyphenyl). |
| τ-Methoxynaphthylmercuric chloride | Bis (α-methoxynaphthyl). |
| Tetrahydronaphthylmercuric chloride | Bis (tetrahydronaphthyl). |
| Fluorenylmercuric chloride | Bis (fluorenyl). |
| Xylylmercuric chloride | Bis (xylyl). |
| Hydrindenylmercuric chloride | Bis (hydrindenyl). |
| Mercaptophenylmercuric chloride | Bis (mercaptophenyl). | carbon thereof, to produce an aryl mercuric salt in which the aryl group contains said benzene ring to which the mercury is directly attached, and reacting the aryl mercuric salt with a palladous salt at a temperature in the range of 20 to 150° C. to produce said diaryl compound.

9. The process of claim 8 wherein mercuric bis(methane sulfonate) is reacted with the aryl compound to produce an aryl mercuric methane sulfonate.

10. The process of claim 9 wherein the aryl mercuric methane sulfonate is produced in situ.

References Cited

UNITED STATES PATENTS 3,316,290   4/1967   Fenton _____ 260—484

JAMES A. PATTEN, Primary Examiner

U.S. Cl. X.R.

260—433, 434.47, 609, 613, 645, 646, 649, 670

PO-1050
(5/69)

UNITED STATES PATENT OFFICE
CERTIFICATE OF CORRECTION

Patent No. __U.SP. 3,539,622__   Dated __November 10, 1970__

Inventor(s) __Richard F. Heck (Case 21)__

It is certified that error appears in the above-identified patent and that said Letters Patent are hereby corrected as shown below:

Col. 3 of p.p.; Page 7 of spec.; In the tabulation, under Aryl Mercuric Salt:
Line 17 reads: α-Methoxyphenylmeruric chloride --
                Should read
      o-Methoxyphenylmercuric chloride --

Line 19 reads: T-Methoxynaphthylmercuric chloride --
                Should read
      α-Methoxynaphthylmercuric chloride --

Col. 4, Line 11 of p.p.; Line 2 of Claim 1 in spec. "contacting" should be inserted after "comprises"

Col. 4, Line 27 of p.p.; Line 11 of Claim 2 in spec. "monovlent" -- should read -- "monovalent"

FEB 23 1971

(SEAL)
Attest:

Edward M. Fletcher, Jr.
Attesting Officer

WILLIAM E. SCHUYLER, JR
Commissioner of Patents